United States Patent
Uhkoetter et al.

(10) Patent No.: US 10,731,747 B2
(45) Date of Patent: Aug. 4, 2020

(54) GEARING DEVICE WITH AT LEAST ONE STRUCTURAL COMPONENT THAT ROTATES WITH RESPECT TO A HOUSING APPLIANCE

(71) Applicant: Rolls-Royce Deutschland Ltd & Co KG, Blankenfelde-Mahlow (DE)

(72) Inventors: Stephan Uhkoetter, Berlin (DE); Stephane Prunera-Usach, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 91 days.

(21) Appl. No.: 15/946,429

(22) Filed: Apr. 5, 2018

(65) Prior Publication Data

US 2018/0306308 A1 Oct. 25, 2018

(30) Foreign Application Priority Data

Apr. 19, 2017 (DE) .................. 10 2017 108 332

(51) Int. Cl.
*F16H 57/04* (2010.01)
*F16H 57/021* (2012.01)
(Continued)

(52) U.S. Cl.
CPC ......... *F16H 57/0479* (2013.01); *F01D 25/18* (2013.01); *F01D 25/183* (2013.01);
(Continued)

(58) Field of Classification Search
CPC .. F16H 57/0479; F16H 57/043; F16H 57/082; F16H 57/021; F16H 57/0486; F02C 7/06; F01D 25/18; F05D 2260/98
See application file for complete search history.

(56) References Cited

U.S. PATENT DOCUMENTS 9,810,312 B2 * 11/2017 Obayashi ............ F16H 57/0427
10,302,187 B2 * 5/2019 Lao .......................... F02K 3/025
(Continued)

FOREIGN PATENT DOCUMENTS

DE 8535076 U1 2/1986
DE 102014117841 A1 6/2016
(Continued)

OTHER PUBLICATIONS

German Search Report dated Dec. 4, 2017 for counterpart German Application No. 10 2017 108 332.4.

*Primary Examiner* — Sherry L Estremsky
(74) *Attorney, Agent, or Firm* — Shuttleworth & Ingersoll, PLC; Timothy J. Klima

(57) ABSTRACT

A gear device with a housing and a structural component rotatably mounted at the housing by a bearing that delimits a housing interior space. The gear device has a hydraulic fluid supply line for supplying hydraulic fluid into the interior space. A gap provides sealing between the housing and structural component. The gap is arranged radially between the housing and a further rotatable structural component or between a further housing and the structural component. A further bearing rotatably mounts the further structural component in the area of the housing or rotatably mounts the structural component at the further housing. An appliance couples the further structural component to the structural component or couples the housing to the further housing, and facilitates a relative movement between the further structural component and the structural component or between the housing and the further housing in the axial and/or radial directions.

15 Claims, 7 Drawing Sheets

(51) Int. Cl.
  *F16H 57/029* (2012.01)
  *F16H 57/08* (2006.01)
  *F01D 25/18* (2006.01)
  *F02C 7/06* (2006.01)
  *F02C 7/36* (2006.01)

(52) U.S. Cl.
  CPC ............ *F02C 7/06* (2013.01); *F16H 57/021* (2013.01); *F16H 57/029* (2013.01); *F16H 57/043* (2013.01); *F16H 57/046* (2013.01); *F16H 57/0486* (2013.01); *F16H 57/082* (2013.01); *F02C 7/36* (2013.01); *F05D 2260/40311* (2013.01); *F05D 2260/98* (2013.01)

(56) References Cited

U.S. PATENT DOCUMENTS

| | | | |
|---|---|---|---|
| 2007/0049448 A1* | 3/2007 | Smet | F16H 57/0479 475/159 |
| 2016/0160993 A1 | 6/2016 | Vinter | |
| 2017/0023123 A1 | 1/2017 | McCune | |

FOREIGN PATENT DOCUMENTS

| | | |
|---|---|---|
| EP | 3070377 A1 | 9/2016 |
| WO | WO2004018886 A1 | 3/2004 |

\* cited by examiner

GEARING DEVICE WITH AT LEAST ONE STRUCTURAL COMPONENT THAT ROTATES WITH RESPECT TO A HOUSING APPLIANCE

This application claims priority to German Patent Application DE102017108332.4 filed Apr. 19, 2017, the entirety of which is incorporated by reference herein.

The invention relates to a gear device with at least one structural component that rotates with respect to a housing device and delimitates an internal space of the gear device against the housing appliance, and a hydraulic fluid supply line as it is defined more closely herein.

Jet engines or aircraft engines as they are known from practice are configured, among other components, with gear devices embodied as a planetary gear via which a fan or blower is in operative connection with a turbine appliance. At that, these planetary gears in standard design usually comprise a hollow wheel, multiple planetary wheels and a sun wheel, which are in mesh with each other. In the area of a fan shaft, the fan is connected to the planetary carrier of the planetary gear, while a shaft of the turbine appliance is coupled to the sun wheel. In this manner, it is achieved that a drive torque of the turbine appliance that is applied to the planetary gear via the shaft of the turbine appliance is increased corresponding to the stationary gear ratio of the planetary gear, and is supplied to the fan shaft, while the rotational speed of the shaft of the turbine appliance is higher than the rotational speed of the fan shaft by the factor of the stationary gear ratio of the planetary gear.

In known jet engines, the planetary gears are supplied with oil by an oil pump so as to be able to ensure a sufficient lubrication and cooling of the bearings and tooth meshings in particular in so-called high-speed planetary gear sets, and to be able to dissipate heat losses occurring during operation to a desired degree. By means of the oil pump, oil is supplied to the planetary gear with a pressure as it is necessary for supplying the bearings and tooth meshings.

In order to be able to maintain the necessary pressure in the area of the planetary gear, contact seals which are subject to wear and tear during operation are provided in the area of the planetary gears. By means of the contact seals, the area of the planetary gear inside of which the oil that is supplied under pressure is conducted further to the desired extent to the areas of the planetary gear that are to be impinged by oil—such as tooth meshings between the hollow wheel and the planetary wheels or between the planetary wheels and the sun wheel as well as the bearing units—can be sealed against the environment.

What is for example known from WO 2004/018886 A1 is a sealing between a housing and a shaft of a planetary gear by means of a so-called minimal gap seal. Here, the shaft is mounted by means of two bearings with respect to the housing, wherein the bearings are arranged in the area of the minimal gap seal in the axial direction of the shaft on both sides of a hydraulic fluid line through which the hydraulic fluid can be introduced into the shaft from the housing. At that, respectively one gap is present between the shaft and the housing in the axial direction of the shaft between the bearing and the hydraulic fluid line, wherein a leakage volume flow that is drained through the gap between the housing and the shaft is biquadratically dependent on the gap height in the radial direction of the shaft and is linearly dependent on a gap length in the axial direction of the shaft. In this way, a leakage through a gap can be limited by adjusting the gap height to be as small as possible as well as by additionally increasing the gap length.

A minimum of a gap height, which can be adjusted in the area of a maximally wear-free shaft mounting with respect to the housing and by means of which a contact between the shaft and the housing is reliably avoided during operation, is defined by the bearing clearances of the bearings, which in turn are to be designed corresponding to the relative movements of the shaft with respect to the housing as they occur during operation. For this reason, in a wear-free mounting of a shaft, it is often not possible to adjust the leakage released through a sealing gap to the desired extent.

The present invention is based on the objective of providing a gear device that is characterized by a low leakage and at the same time by low wear during operation.

According to the invention, the objective is achieved by means of a gear device with the features described herein.

The gear device according to the invention is embodied with a housing appliance and at least one structural component that is mounted at the housing appliance in a rotatable manner by means of a bearing appliance and that delimits an interior space with respect to the housing appliance. Further, the gear device comprises at least one hydraulic fluid supply line via which the consumption points can be supplied with hydraulic fluid by introducing hydraulic fluid into the interior space. At least one gap is formed to provide sealing between the housing appliance and the structural component.

According to the invention, the at least one gap is arranged between the housing appliance and a further rotatable structural component or between a further housing appliance and the structural component in the radial direction. Further, at least one further bearing appliance is provided by means of which the further structural component is mounted in a rotatable manner in the area of the housing appliance or by means of which the structural component is mounted in a rotatable manner at the further housing appliance. In addition, the gear device according to the invention has at least one appliance that couples the further structural component to the structural component or couples the housing appliance to the further housing appliance, and that facilitates a relative movement between the further structural component and the structural component or between the housing appliance and the further housing appliance in the axial and/or in the radial direction during operation of the gear device.

Through the relative movement that is respectively possible between the housing appliances or between the structural components in the area of the appliance during operation of the gear device, a gap height of the gap between the housing appliance and the further structural component or between the further housing appliance and the structural component can be designed in degree that minimizes a leakage, without increasing wear in the area of the gap during operation. This is ensured based on the fact that a bearing clearance of the at least one further bearing appliance, which defines the minimally adjustable gap height of the gap, can be designed to be advantageously small due to the possible relative movement between the structural components or between the housing appliances. The relative movements that occur during operation between the structural component and the housing appliance are facilitated through a corresponding design of the bearing appliance without the functionality of the gear device according to the invention being compromised. Through the appliance-side decoupling of the housing appliance from the structural component, the relative movements occurring in the area between the structural component and the further structural component or between the housing appliance and the further housing appliance are smaller as compared to the relative movements between the housing appliance and the structural component, which is why the gap height can be designed to be smaller as compared to known gear devices. In this manner, it is in turn achieved that an advantageously small leakage flows through the gap and thus low losses occur during operation in the gear device according to the invention.

In the solution according to the invention, a sufficient sealing of an area is achieved through a minimal gap seal that can be constructionally realized in s simple manner, without having to limit a required bearing clearance of a bearing appliance to a degree that compromises the service life of the bearing appliance.

The appliance is arranged between two rotating structural components when arranged between the structural component and the further structural component, or is arranged between two structural components that are embodied so as to be non-rotating during operation when arranged between the housing appliance and the further housing appliance.

In an advantageous embodiment of the gear device according to the invention, the appliance, which is embodied in particular for movement decoupling and/or for damping movements, is consists of a material that has a lower stiffness, for example a lower modulus of elasticity, than the material of the structural component and/or of the further structural component and/or of the housing appliance and/or the further housing appliance, so that the appliance is in particular embodied to be more flexible than these structural components. Preferably, the appliance is made of steel, aluminum, titanium or the like and/or with an elastomer, or is made of a combination of different materials.

The desired decoupling of the respective structural components from each other which is to be achieved through the appliance can also be achieved through designing the shape of the appliance in a corresponding manner. The design of the appliance by which the desired decoupling of the respective structural components is facilitated varies depending on whether only a movement decoupling and/or a damping of movements or, in addition to the movement decoupling and/or damping of movements, also a sealing of the area conducting the hydraulic fluid is provided. Thus, there is for example the possibility of embodying the appliance in a tubular manner, in the manner of a sleeve, as bellows or the like.

In a constructionally simple embodiment of the invention, the at least one appliance forms a conduction area for conducting hydraulic fluid, wherein hydraulic fluid can preferably be conducted from the hydraulic fluid supply line to the interior space of the gear device through the appliance.

In an advantageous embodiment of the gear device according to the invention, at least one further bearing appliance is provided, comprising two bearing parts arranged at a distance from each other in the axial direction of the gear device and delimiting at least one hydraulic fluid space which is provided in the radial direction between the housing appliance and the further structural component or between the further housing appliance and the structural component and which is in operative connection with the hydraulic fluid supply line.

The at least one further bearing appliance, which can in particular be dimensioned to be smaller than the bearing appliance, is for example embodied as a radial bearing or as an axial bearing and as a radial bearing, in particular as a ball bearing or as a roller bearing and/or as a slide bearing, wherein one slide bearing can be formed through an interaction of the housing appliance with the further structural component or an interaction of the further housing appliance with the structural component in the area of the gap.

If the at least one further bearing appliance adjoins at least one chamber arranged between the gap and the at least one further bearing appliance in the axial direction of the gear device, the hydraulic fluid that is conducted during operation of the gear device through the at least one gap as leakage can be discharged through at least one further bearing appliance, and the hydraulic fluid can be used for cooling and/or lubricating the further bearing appliance.

In an advantageous embodiment of the gear device according to the invention, the chamber that is in particular delimited in the radial direction of the gear device by the housing appliance and the further structural component or by the further housing appliance and the structural component has at least one outlet opening for draining hydraulic fluid. Here, the at least one outlet opening, which is for example embodied as a drainage opening, is preferably arranged in a radially outer wall of the chamber, i.e. inside the housing appliance or the further housing appliance, so that hydraulic fluid present inside the chamber during operation of the gear device is discharged from the chamber by means of the centrifugal force through the at least one outlet opening, and is either not conducted or not conducted completely through the further bearing appliance. In this manner, friction and undesired heat development in the area of the further bearing appliances can be advantageously reduced.

To further reduce or completely stop undesired conduction of hydraulic fluid from the chamber through the further bearing appliance, a hydraulic fluid conduction appliance, which is for example embodied as a draining nose, can be arranged in the area of the chamber, being embodied for guiding hydraulic fluid that is conducted through the gap into the chamber in the direction of the outlet opening of the chamber. Alternatively or additionally, the at least one further bearing appliance can also be embodied as a bearing appliance that is sealed off at least against the chamber.

In an advantageous embodiment of a gear device according to the invention, the hydraulic fluid supply line is connected in a flexible manner and in particular by means of a sealing appliance to the further housing appliance and/or the housing appliance, so that relative movements of the structural component with respect to the housing appliance can be compensated in the area of the connections of the hydraulic fluid supply lines provided one the one hand to the housing appliance and on the other hand in the area of the hydraulic fluid space to the further housing appliance.

In the circumferential direction of the gear device, multiple hydraulic fluid supply lines and/or multiple hydraulic fluid spaces and/or multiple appliances can be provided. Preferably, multiple appliances are provided in the circumferential direction of the gear device, respectively having a for example tubular conduction area for passing hydraulic fluid from at least one hydraulic fluid space into the interior space of the gear device.

In an advantageous embodiment of the gear device according to the invention, a hydraulic fluid space extending in particular completely around the circumferential direction of the gear device is provided, and/or the appliance in particular forms a conduction area that completely extends around the circumferential direction of the gear device.

The gear device is preferably embodied as a planetary gear with an input shaft and an output shaft, and has a sun wheel, multiple planetary wheels and a hollow wheel, wherein the planetary wheels are connected to a planetary carrier in a rotatable manner.

The planetary gear is preferably part of a turbomachine that is embodied as a jet engine, wherein one structural component of the planetary gear, in particular a planetary carrier of the planetary gear device, is in operative connection with a fan of the turbomachine, and a further structural component of the planetary gear device, in particular a sun wheel of the planetary gear device, is in operative connection with a turbine appliance of the turbomachine, such as a low-pressure turbine or the like, wherein the hollow wheel is attached to the housing.

The structural component is preferably a planetary carrier of the planetary gear device or a shaft that is connected in a torque-proof manner with the planetary carrier.

The features specified in the patent claims as well as the features specified in the following exemplary embodiments of the gear device according to the invention are suitable to further develop the subject matter according to the invention respectively on their own or in any desired combination with each other.

Further advantages and advantageous embodiments of the gear device according to the invention follow from the patent claims and from the exemplary embodiments that are described in principle in the following by referring to the drawing, wherein, with a view to clarity, the same reference signs are used in the description of the exemplary embodiments for structural components having the same structure and functionality.

Herein:

Figure 1:
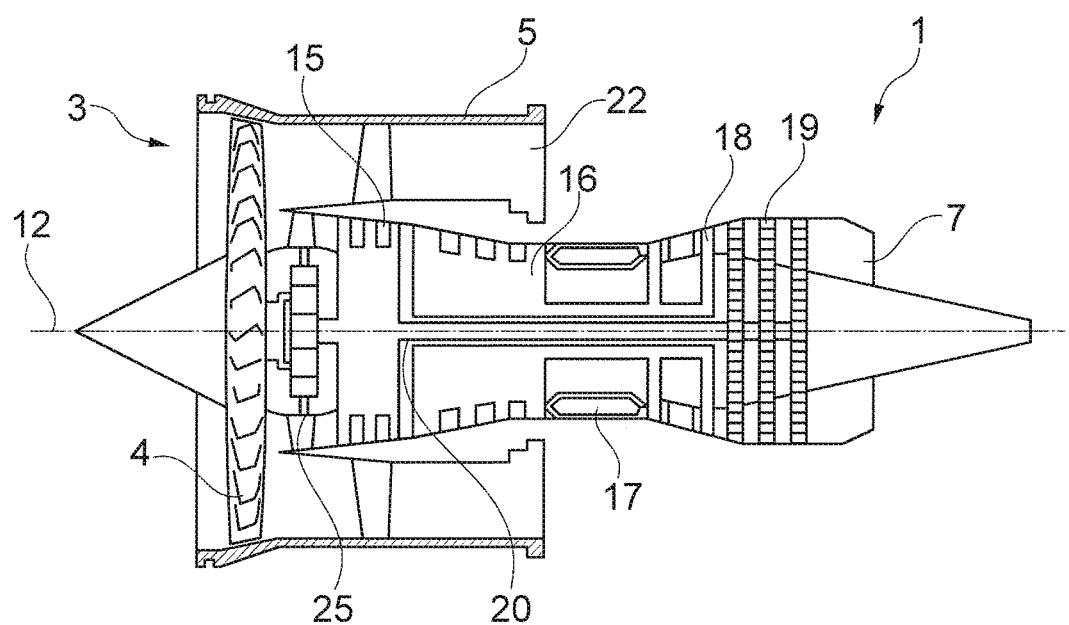
FIG. 1 shows a simplified sectional view of a jet engine with a fan and with a low-pressure turbine, wherein the fan is in operative connection with the low-pressure turbine via a planetary gear device that is shown in a strongly schematized manner.
Figure 2:
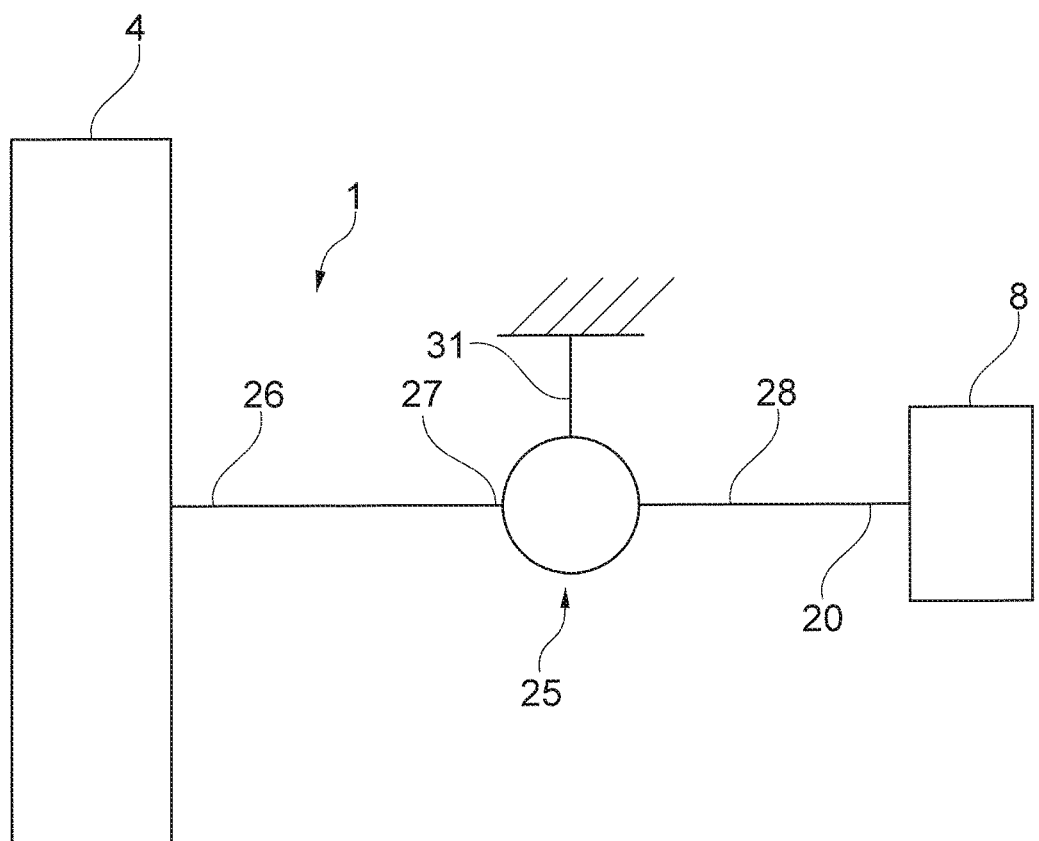
FIG. 2 shows a strongly schematized rendering of a partial area of the jet engine according to FIG. 1 that comprises the planetary gear device, wherein the fan is in operative connection with the planetary carrier of the planetary gear device and the low-pressure turbine is in operative connection with the sun wheel of the planetary gear device.
Figure 3:
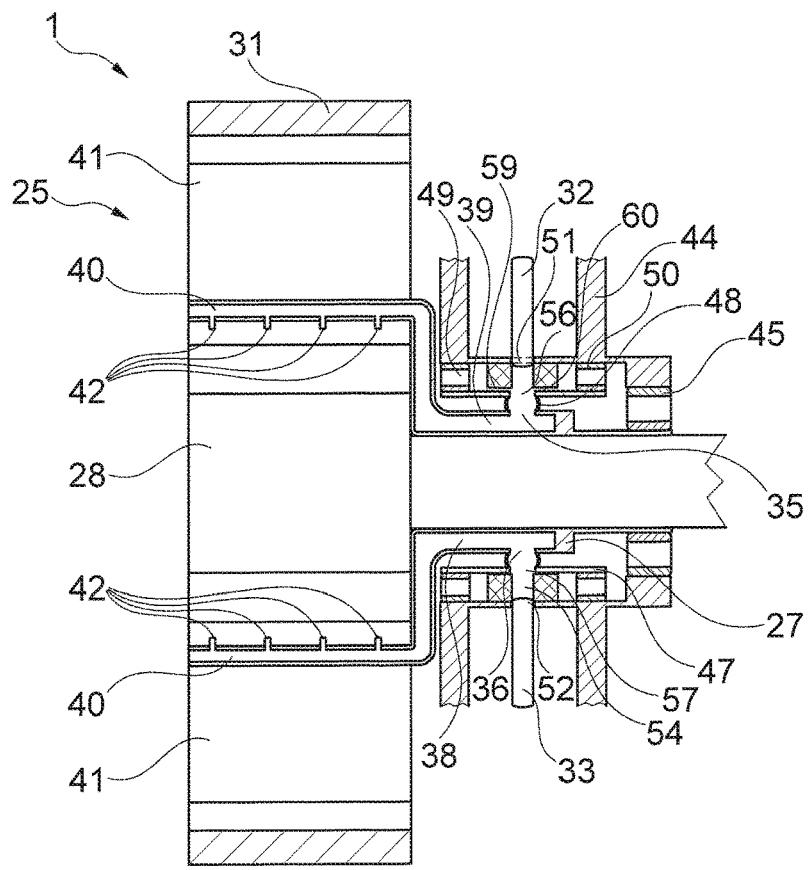
Figure 4:
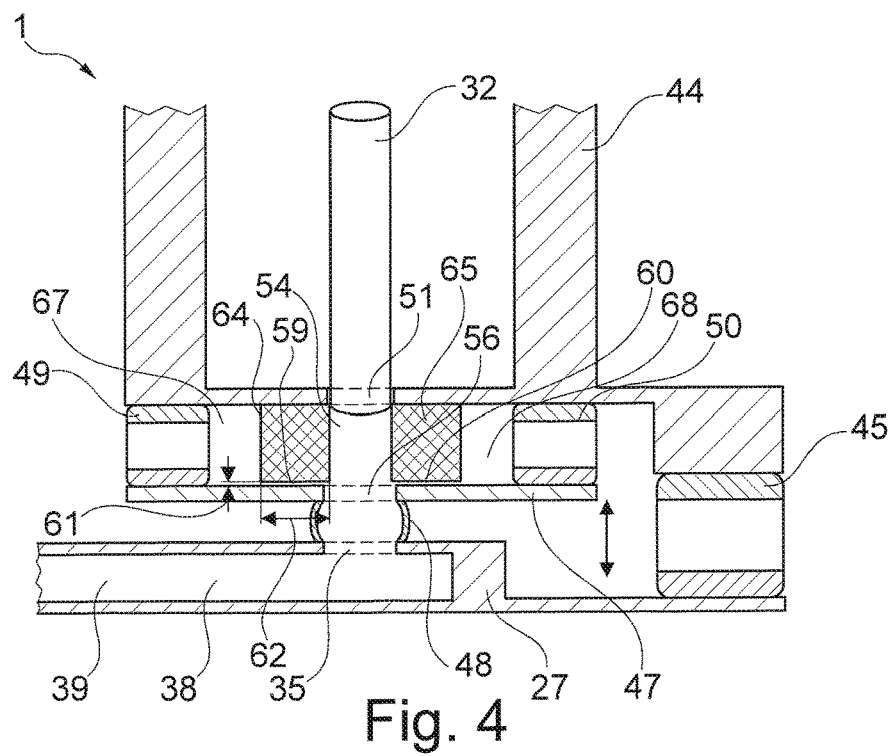
Figure 5:
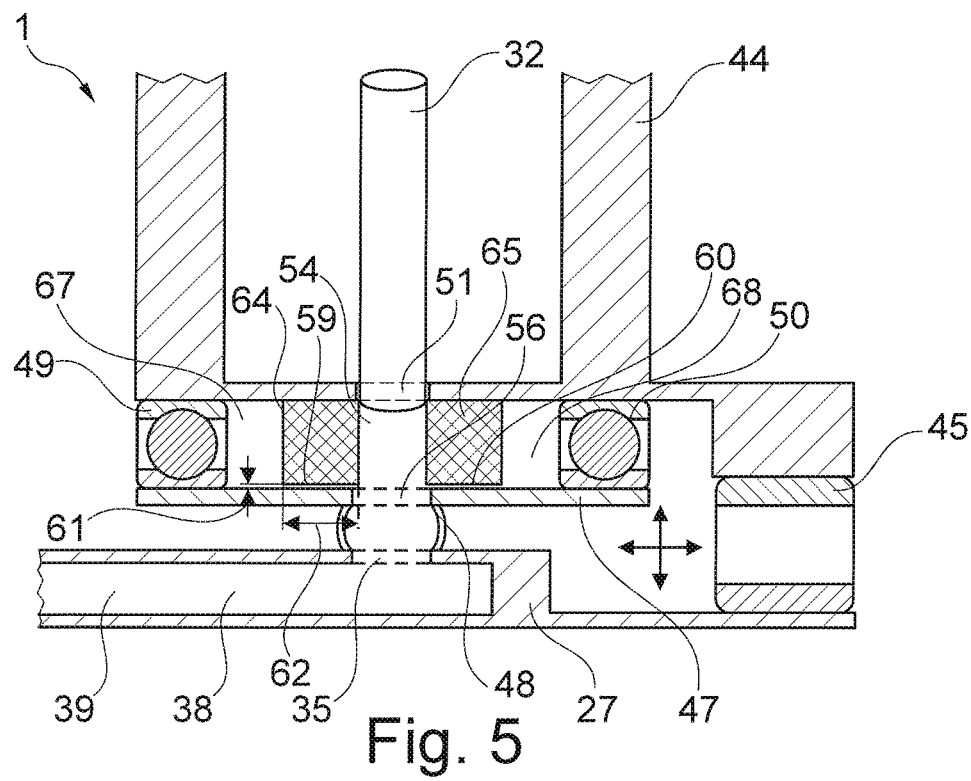
Figure 6:
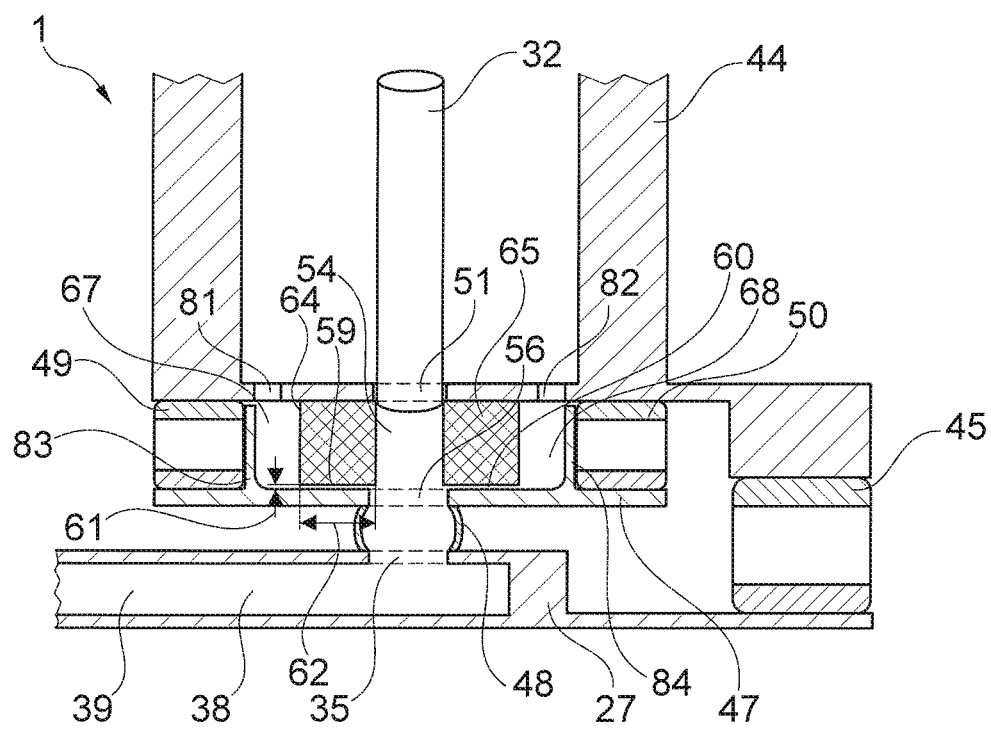
Figure 7:
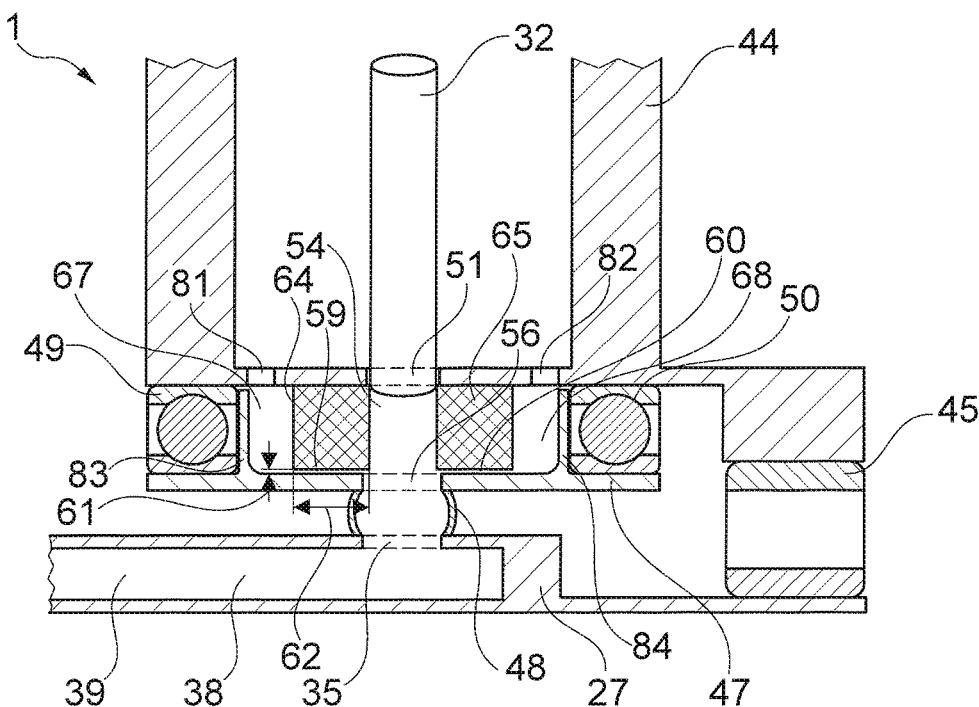
Figure 8:
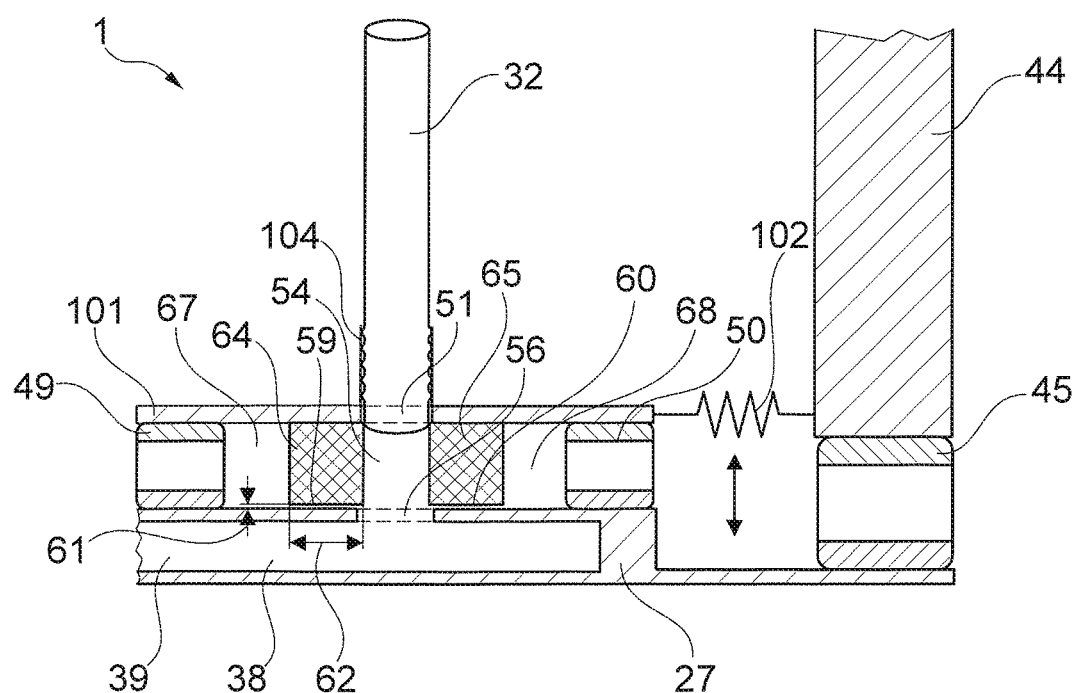
Figure 9:
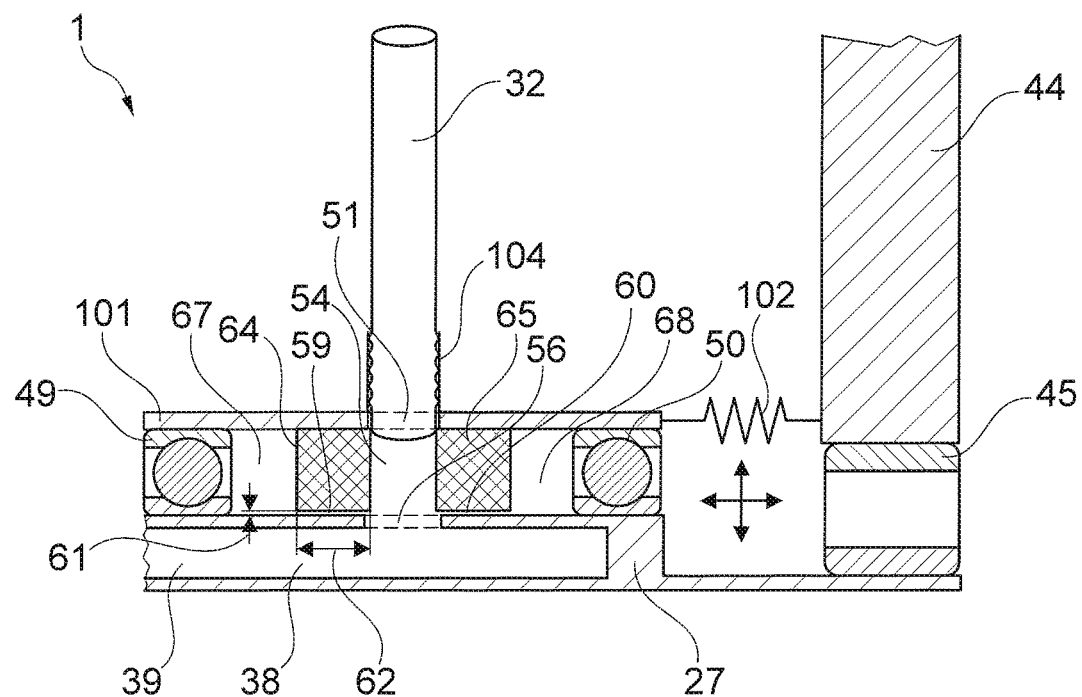
Figure 10:
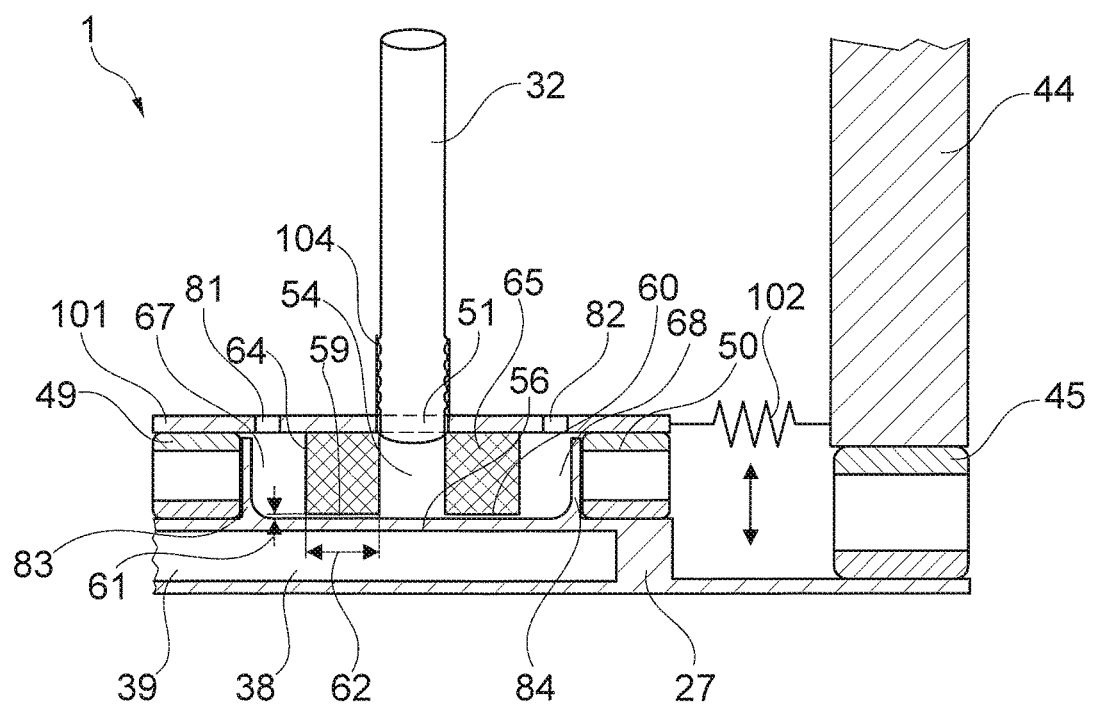
Figure 11:
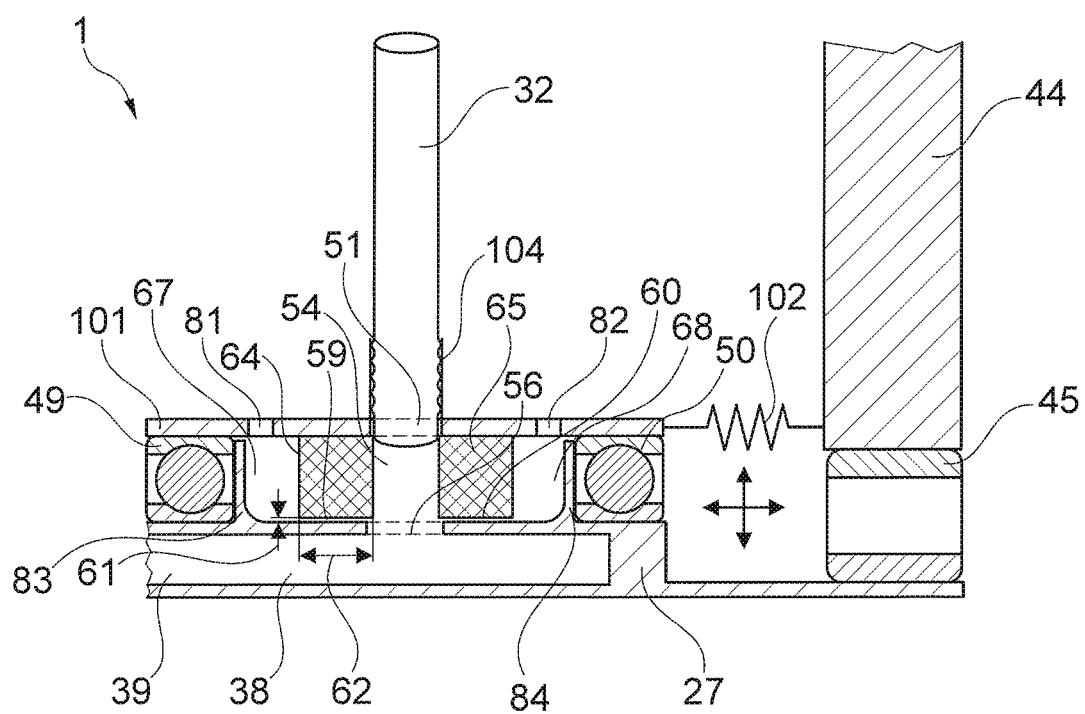

FIG. 3 shows a simplified sectional view of a first embodiment of the planetary gear device according to FIG. 1 and FIG. 2, wherein a planetary carrier is mounted by means of a bearing appliance in a housing appliance and a further structural component rotating with the planetary carrier is mounted by means of further bearing appliances in the housing appliance, wherein the further structural component is connected to the planetary carrier by means of an appliance, and wherein a hydraulic fluid line is provided for supplying the consumption points inside the planetary gear device;

FIG. 4 shows an enlarged view of a section of the planetary gear device according to FIG. 3;

FIG. 5 shows a view of a second embodiment of a planetary gear device corresponding to FIG. 3;

FIG. 6 shows a view of a third embodiment of a planetary gear device corresponding to FIG. 3;

FIG. 7 shows a view of a fourth embodiment of a planetary gear device corresponding to FIG. 3;

FIG. 8 shows a view of a fifth embodiment of a planetary gear device corresponding to FIG. 3, wherein a further housing appliance that is connected via an appliance to the housing appliance is provided, inside of which the planetary carrier is mounted by means of the further bearing appliances;

FIG. 9 shows a view of a sixth embodiment of a planetary gear device corresponding to FIG. 8;

FIG. 10 shows a view of a seventh embodiment of a planetary gear device corresponding to FIG. 8; and FIG. 11 shows a view of an eighth embodiment of a planetary gear device corresponding to FIG. 8.

FIG. 1 shows a turbomachine that is embodied as a jet engine 1 or gas turbine engine that can be embodied with a gear device according to the invention. As will become clear in the following, the gear device according to the invention can also be used in other turbomachines or fluid-flow machines.

The jet engine 1 has a main axis and a rotational axis 12 auf. Further, the jet engine 1 comprises, in the axial flow direction, an air intake 3, a fan 4, a gear device 25, an intermediate-pressure compressor 15, a high-pressure compressor 16, a combustion appliance 17, a high-pressure turbine 18, a low-pressure turbine 19 and an outflow nozzle 7. An engine nacelle 5 surrounds the gas turbine engine 1 and delimits the intake 3.

The jet engine 1 operates in a conventional manner, wherein air entering the intake 3 is accelerated by the fan 4 to create two air flows. A first air flow flows into the intermediate-pressure compressor 15, and a second air flow is conducted through a bypass channel 22 to provide a drive thrust. The intermediate-pressure compressor 15 compresses the air flow supplied thereto before the air is further compressed in the area of the high-pressure compressor 16.

The compressed air that is discharged from the high-pressure compressor 16 is introduced into the combustion appliance 17, where an intermixing with fuel occurs, and the fuel-air mixture is combusted. The resulting hot combustion products expand and in doing so drive the high-pressure turbine 18 and the low-pressure turbine 19, before they are discharged via the discharge nozzle 7 to provide additional drive thrust. The high-pressure turbine 18 and the low-pressure turbine 19 respectively drive the high-pressure compressor 16 or the intermediate-pressure compressor 15 via a suitable connecting shaft. The connecting shaft 20 that couples the low-pressure turbine 19 to the intermediate-pressure compressor 15 also drives the fan 4 via the gear device 25.

FIG. 2 shows a section of the jet engine 1 according to FIG. 1 in a strongly schematized manner, wherein the gear device 25 shown in FIG. 1 is embodied as a planetary gear or planetary gear device. Here, the connecting shaft or shaft 20 is connected to a sun wheel 28 of the planetary gear device 25, whereas, in the area of a fan shaft 26, the fan 4 is in operative connection with a structural component of the planetary gear device 25 that represents a rotating planetary carrier 27. In the shown embodiment of the planetary gear device 25, a hollow wheel 31 of the planetary gear device 25 is arranged in a manner fixated at the housing. In alternative embodiments of the gear device, the planetary carrier or the sun wheel can also be embodied in a manner fixated to the housing.

With the shown coupling of the fan shaft 26 and shaft 20 of the low-pressure turbine 19 to the planetary gear device 25, a drive torque applied to the planetary gear device 25 via the shaft 20 is increased corresponding to the stationary gear ratio of the planetary gear device 25, and is supplied to the fan shaft 26, while the speed of the shaft 20 is larger than the speed of the fan shaft 26 by the factor of the stationary gear ratio of the planetary gear device 25. If the fan 4 is driven by the low-pressure turbine 19, the speed of the shaft 20 is reduced corresponding to the gear ratio of the planetary gear device 25 in the area of the planetary gear device 25, and the fan shaft 26 as well as the fan 4 are driven with this reduced speed and with a torque that is increased with respect to the torque applied to the shaft 20.

FIG. 3 and FIG. 4 show that, in order to supply the consumption points of the planetary gear device 25 with hydraulic fluid or oil, the planetary gear device 25 is supplied with oil for example by means of a hydraulic pump of a ancillary unit gear device through multiple hydraulic fluid supply lines 32, 33, which in the present case are arranged so as to be distributed about the circumferential side the sun wheel 28, wherein here oil can be introduced into an interior space 38 of the planetary gear device 25 that is delimited at least in certain areas by the planetary carrier 27 through multiple supply openings 35, 36 arranged in a manner distributed about the circumferential side in the planetary carrier 27 or a shaft that is attached in a torque-proof manner to the planetary carrier 27.

Via a conduction area 39 that is arranged in the interior space 38 of the planetary gear device 25, the oil that is supplied through the supply openings 35, 36 is supplied to a further conduction area 40 arranged in the circumferential direction of the planetary gear device 25 between planetary wheels 41 of the planetary gear device 25 in the area of tooth meshings of the planetary wheels 41 with the sun wheel 28, which extends substantially in the axial direction of the planetary gear device 25 and is arranged downstream of the conduction area 39.

In the further conduction area 40, which is embodied as a so-called spraybar or as a nozzle assembly, a plurality of outlet openings 42 are arranged, via which in the present case tooth meshings between the planetary wheels 41 of the planetary gear device 25 and of the sun wheel 28 can be supplied with oil. In the present case, a further conduction area 40 is assigned to each planetary wheel 41, so that oil can be supplied to the desired extent to the respective tooth meshings of the planetary wheels 41 with the sun wheel 28.

For mounting the planetary carrier 27 at a static housing appliance 44 of the jet engine 1, a bearing appliance is provided, which in the present case is embodied as a roller bearing 45. In addition, a further structural component 47 is provided, which rotates substantially with the same rotational speed as the planetary carrier 27, and is for example embodied as a hollow shaft that is mounted in the area of the housing appliance 44 by means of two further bearing appliances 49, 50 that in the present case are embodied as roller bearings.

In the present case, the further structural component 47 that here forms a carrier shaft for the further bearing appliances 49, 50, is connected to the planetary carrier 27 by means of an appliance 48 that is extends completely about the circumferential direction of the planetary gear device 25 and forms a conduction area for conducting oil, wherein the appliance 48 rotates with a speed that is substantially identical to that of the planetary carrier 27 and thus in a wear-free manner during operation of the jet engine 1. The appliance 48 facilitates a relative movement of the planetary carrier 27 with respect to the further structural component 47.

Due to the embodiment of the further bearing appliances 49, 50 as roller bearings, a displacement of the further structural component 47 with respect to the housing appliance 44 is facilitated in their area in the axial direction of the planetary gear device 25, so that, in the embodiment according to FIG. 3 and FIG. 4, the appliance 48 is embodied in particular for decoupling the further structural component 47 from relative movements with respect to the housing appliance 44 in the radial direction of the planetary gear device 25. For this purpose, the appliance 48 is for example embodied with a material that has a lower stiffness than a material of the housing appliance 44 and a material of the planetary carrier 27. Alternatively or additionally, the movability of the planetary carrier 27 with respect to the further structural component 47 can also be influenced by a corresponding shape of the appliance, wherein the appliance can be embodied in a tubular or sleeve-shaped manner, for example.

Via recesses 51, 52 arranged in the housing appliance 44, the hydraulic fluid supply lines 32, 33 are connected to a hydraulic fluid space or oil space 54 that in the present case extends completely about the circumferential direction of the planetary gear device 25 and is arranged between the housing appliance 44 and the further structural component 47, and that in turn acts together with the appliance 48 via the recesses 56, 57 that are arranged in the further structural component 47. Thus, oil can be supplied via the hydraulic fluid supply lines 32, 33 into the oil space 54 that is delimited in the axial direction of the planetary gear device 25 by respectively one area 64, 65 of the housing appliance 44, and from there through the appliance 48 to the interior space 38 of the planetary gear device 25.

In the radial direction of the planetary gear device 25 between the areas 64, 65 of the housing appliance 44 and the further structural component 47, respectively one gap 59, 60 or sealing gap is arranged adjacent to the oil space 54 in the axial direction of the planetary gear device 25. The respective gap 59, 60 has a gap height 61 in the radial direction of the planetary gear device 25 and a gap length 62 in the axial direction of the planetary gear device 25. Through the respective gap 59, 60, the oil space 54 is connected to a chamber 67 or 68 that is arranged between a further bearing appliance 49 or 50 and the respective area 64 or 65 of the housing appliance 44 in the axial direction of the planetary gear device 25.

During operation of the jet engine 1, oil is conducted as a leakage through the respective gap 59, 60 into the respectively adjacent chamber 67, 68, wherein the amount of leakage is influenced by the respective gap height 61 and the respective gap length 62. In the planetary gear device 25, the leakage oil is conducted from the respective chamber 67, 68 through the further bearing appliances 49, 50 from the respective chamber 67, 68, wherein the further bearing appliances 49, 50 are cooled and lubricated through the oil in the process.

During operation of the jet engine 1, relative movements of the planetary carrier 27 with respect to the housing appliance 44 occur, which are facilitated through corresponding bearing clearances of the bearing appliance 45 and the further bearing appliances 49, 50 to an extent as it is necessary for the functioning of the gear device 25. Through the direct mounting of the planetary carrier 27 in the housing appliance 44 by means of the bearing appliance 45, a substantial share of these relative movements is facilitated by the bearing clearance of the bearing appliance 45. In the area of the appliance 48, the further structural component 47 is operatively connected to the planetary carrier 27 in such a manner, that the relative movements of the planetary carrier 27 with respect to the housing appliance 44, as they occur during operation, are transferred through the appliance 48 to the further structural component 47 only to a small extent, whereby relative movements of the further structural components 47 with respect to the housing appliance 44 are smaller than the relative movements of the planetary carrier 27 with respect to the housing appliance 44. This makes it possible to realize the further bearing appliances 49, 50 with a smaller bearing clearance than the bearing appliance 45, so that the housing appliance 44 is in operative connection with the further structural component 47 in the area of the respective gap 59, 60 in a wear-free manner, even in the case of a small gap height 61 that results in strong sealing. Through the gap height 61 that now provides a required sealing effect in the area of the respective gap 59, 60 a leakage through the gap 59, 60, which is known to depend significantly on the gap height 61, can be reduced as compared to known embodiments.

FIG. 5 to FIG. 7 show further embodiments of planetary gear devices 70, 80, 90, in which the planetary carrier 27 is connected by means of an appliance 48 to the further structural component 47 in a manner comparable to planetary gear device 25. When it comes to the functionality of the planetary gear devices 70, 80, 90 that will be described in more detail in the following, it is generally referred to the description regarding the planetary gear device 25, and in the following substantially only the differences between the planetary gear device 25 and the planetary gear devices 70, 80, 90 are described in more detail.

In the planetary gear device 70 according to FIG. 5, the further bearing appliances 49, 50 are embodied as ball bearings. Since no movement is possible in the axial direction of the planetary gear device 70 in the area of the ball bearings, the appliance 48 is embodied not only for decoupling the further structural component 47 from the housing appliance 44 in the radial direction of the planetary gear device 70, but also for decoupling the further structural component 47 with respect to the housing appliance 55 in the axial direction of the planetary gear device 70.

In the planetary gear device 80 according to FIG. 6, the housing appliance 44 has multiple outlet openings 81, 82 which are embodied as drainage bores and distributed in the circumferential direction of the planetary gear device 80 in an area that delimits the chamber 67 or 68. Through them, the oil can be drained from the respective chamber 67 or 68 as a result of the centrifugal force acting on the oil during operation of the jet engine 1.

In addition, in the present case a hydraulic fluid conduction appliance, which is embodied integrally with the further structural component 47 and configured as a draining nose 83, 84, is arranged in each chamber 67 or 68. In the present case, it is arranged in the axial direction of the planetary gear device 80 in an area of the chamber 67 or 68 that adjoins the respective further bearing appliance 49 or 50, and extends in the radial direction of the planetary gear device 80 almost up to the housing appliance 44. Through the draining nose 83, 84, the respective further bearing appliance 49, 50 is protected from being supplied with leakage oil that may lead to losses and undesired heat development in the area of the further bearing appliance 49, 50. In addition, leakage oil present in the chamber 67, 68 is supplied to the drainage bores 81, 82 via the draining nose 83, 84.

The planetary gear device 90 shown in FIG. 7 substantially corresponds to planetary gear device 80, wherein, in contrast to the planetary gear device 80, in the planetary gear device 90 the further bearing appliances are embodied as ball bearings in a manner comparable to the embodiment of the planetary gear device 70, so that the appliance 48 is again embodied for decoupling the further structural component 47 with respect to the housing appliance 44 in the radial direction and in the axial direction of the planetary gear device 80.

FIG. 8 to FIG. 11 show further planetary gear devices 100, 110, 120, 130 that differ from the planetary gear devices 25, 70, 80, 90 in that a further housing appliance 101 is provided instead of the further structural component 47 for reducing relative movements in the area of a sealing gap 59, 60, with the further housing appliance 101 being connected to the housing appliance 44 by means of an appliance 102 that can be embodied in a manner comparable to appliance 48 and is shown in FIG. 8 to FIG. 11 in a strongly schematized manner. In contrast to the planetary gear devices 25, 70, 80, 90, in which the appliance 48 is arranged between two structural components 44, 47 that rotate during operation, in the planetary gear devices 100, 110, 120, 130 the appliance 102 is arranged between two static structural components 44, 101.

The planetary carrier 27 or a shaft that is connected to the planetary carrier 27 in a torque-proof manner is mounted directly in the area of the further housing appliance 101 by means of the further bearing appliances 49, 50, wherein oil from the oil space 54 can be introduced through the supply openings 35, 36 of the planetary carrier 27 directly into the interior space 38 of the planetary carrier 27.

Here, it can again be achieved through the appliance 102 in a constructionally simple manner that the bearing appliance 45 facilitates relative movements of the planetary carrier 27 with respect to the rigidly embodied housing appliance 44, without also having to increase the gap height 61 of the sealing gaps 59, 60 to a degree that would reduce the sealing effect. Here, the appliance 102 operates in such a manner that the further housing appliance 101 is connected to the housing appliance 44 in the area of the appliance 102, and in addition is decoupled to such a degree that the further housing appliance 101 is moved together with the planetary carrier 27 to a certain degree during operation of the planetary gear device 25, and relative movements between the planetary carrier 27 and the further housing appliance 101 are smaller that between the planetary carrier 27 and the housing appliance 44. This in turn provides the possibility to design the bearing clearance of the further bearing appliances 49, 50 in such a way that the gap height 61 can be designed to be as small as possible in order to achieve a strong sealing effect, while at the same time avoiding any contact between the further housing appliance 101 and the planetary carrier 27 in the area of the gaps 59, 60 across the entire operating range of the planetary gear 25.

In the embodiments of the planetary gear device 100 and 120 according to FIG. 8 and FIG. 10, the further bearing appliances 49, 50 are again embodied as roller bearings, so that the appliance 102 is in particular embodied for decoupling the further housing appliance 101 from the housing appliance 44 in the radial direction of the planetary gear device 100. By contrast, in the embodiments of the planetary gear device 110 and 130 according to FIG. 9 and FIG. 11, the further bearing appliances 49, 50 are embodied as ball bearings, so that in this case the appliance 102 is additionally embodied for decoupling the further housing appliance 101 from the housing appliance 44 in the axial direction of the planetary gear device 100.

Here, the planetary gear devices 100 and 110 are embodied without a draining nose 83 or 84, whereas the planetary gear devices 120 and 130 in chamber 67 or 68 have one draining nose 83 or 84, respectively.

In the planetary gear devices 110, 110, 120, 130, relative movements between the planetary carrier 27 and the housing appliance 44 occur during operation of the jet engine 1, leading to relative movements of the further housing appliance 101 with respect to the housing appliance 44 via the appliance 102. Since the hydraulic fluid supply lines 32, 33 are firmly connected to the housing appliance 44 in an area that faces away from the further housing appliance 101, the hydraulic fluid supply lines 32, 33 are connected in a flexible manner to the housing appliance 44 and/or the further housing appliance 101, for example by providing respectively one sealing appliance 104, in order to compensate for these relative movements.

PARTS LIST 1 turbomachine; jet engine
3 air intake
4 fan
5 engine nacelle
7 discharge nozzle
12 engine axis
15 intermediate-pressure compressor
16 high-pressure compressor
17 combustion appliance
18 high-pressure turbine
19 low-pressure turbine
20 connecting shaft
22 bypass channel
25 gear device; planetary gear device
26 fan shaft
27 structural component of the planetary gear device; planetary carrier
28 sun wheel
31 hollow wheel of the planetary gear device
32, 33 hydraulic fluid supply line
35, 36 supply opening
38 interior space of the planetary gear device
39 conduction area
40 further conduction area
41 planetary wheel
42 outlet opening
44 housing appliance
45 bearing appliance; roller bearing
47 further structural component; hollow shaft
48 appliance
49, 50 further bearing appliance
51, 52 recess
54 hydraulic fluid space; oil space
56, 57 recesses
59, 60 gap; sealing gap
61 gap height
62 gap length
64, 65 area of the housing appliance
67, 68 chamber
70 gear device; planetary gear device
80 gear device; planetary gear device
81, 82 outlet opening; drainage bore
83, 84 hydraulic fluid conduction appliance; draining nose
90 gear device; planetary gear device
100 gear device; planetary gear device
101 further housing appliance
102 appliance
104 sealing appliance

The invention claimed is:

1. A gear device arranged about a rotational axis, comprising:
   a housing including an interior space;
   a first bearing;
   a structural component mounted at the housing in a rotatable manner by the first bearing to seal the interior space with respect to the housing, wherein the structural component includes at least one hydraulic fluid supply line through which a consumption point is supplied with hydraulic fluid by introducing the hydraulic fluid into the interior space, and wherein at least one gap is formed for controlling sealing between the housing and the structural component;
   a flexible coupling;
   at least one second bearing;
   further comprising one chosen from:
      a further housing coupled to the housing by the flexible coupling, wherein the structural component is mounted in an area of the further housing in a rotatable manner by the at least one second bearing, and wherein the at least one gap is arranged in a radial direction between the further housing and the structural component with respect to the rotational axis; and
      a further structural component coupled to the structural component by the flexible coupling, wherein the further structural component is mounted in an area of the housing in a rotatable manner by the at least one second bearing, and wherein the at least one gap is arranged in the radial direction between the housing and the further structural component; and
   wherein the flexible coupling facilitates a relative movement between the further structural component and the structural component or between the housing and the further housing in at least one chosen from the radial direction and an axial direction with respect to the rotational axis.

2. The gear device according to claim 1, wherein the flexible coupling is made of a material that has a lower stiffness than a material of at least one chosen from the structural component, the further structural component, the housing, and the further housing.

3. The gear device according to claim 1, wherein the flexible coupling is made with a metallic material.

4. The gear device according to claim 1, wherein the flexible coupling is shaped in one chosen from a tubular manner and a sleeve.

5. The gear device according to claim 1, wherein the flexible coupling forms a conduction area for conducting the hydraulic fluid.

6. The gear device according to claim 1, wherein the at least one second bearing includes two bearing parts that are arranged at a distance from each other in the axial direction of the gear device and wherein the two bearing parts delimit at least one hydraulic fluid space, wherein the at least one hydraulic fluid space is provided in the radial direction between the housing and the further structural component or between the further housing and the structural component, and wherein the at least one hydraulic fluid space is in operative connection with the at least one hydraulic fluid supply line in the axial direction of the gear device.

7. The gear device according to claim 1, wherein the at least one second bearing is a radial bearing or at least one chosen from a ball bearing, a roller bearing, and a slide bearing.

8. The gear device according to claim 1, further comprising a chamber arranged in the axial direction of the gear device, wherein the chamber is arranged between the at least one gap and the at least one second bearing, and wherein the at least one second bearing adjoins the chamber.

9. The gear device according to claim 8, wherein the chamber includes an outlet opening for draining hydraulic fluid.

10. The gear device according to claim 9, further comprising a hydraulic fluid conductor arranged in an area of the chamber for guiding hydraulic fluid conducted through the gap into the chamber in a direction of the outlet opening.

11. The gear device according to claim 1, wherein the at least one hydraulic fluid supply line is connected to at least one chosen from the further housing and the housing in a flexible manner.

12. The gear device according to claim 1, further comprising at least one chosen from a plurality of the hydraulic fluid supply lines, a plurality of hydraulic fluid spaces, and a plurality of the flexible couplings provided in a circumferential direction with respect to the rotational axis.

13. The gear device according to claim 1, further comprising a conduction area extending about a circumferential direction with respect to the rotational axis, wherein the conduction area is formed by at least one chosen from:
- at least one hydraulic fluid space extending about a circumferential direction of the gear device, and
- the flexible coupling.

14. The gear device according to claim 1, wherein the structural component is a planetary carrier.

15. The gear device according to claim 1, wherein the flexible coupling is made with at least one chosen from steel, aluminum, titanium and an elastomer.

* * * * *